(12) United States Patent
Hull et al.

(10) Patent No.: US 7,573,604 B2
(45) Date of Patent: Aug. 11, 2009

(54) PRINTER WITH EMBEDDED RETRIEVAL AND PUBLISHING INTERFACE

(75) Inventors: Jonathan J. Hull, San Carlos, CA (US); Kurt Wesley Piersol, Menlo Park, CA (US); Jamey Graham, San Jose, CA (US); Peter E. Hart, Menlo Park, CA (US)

(73) Assignee: Ricoh Co., Ltd. (JP)

( * ) Notice: Subject to any disclaimer, the term of this patent is extended or adjusted under 35 U.S.C. 154(b) by 0 days.

(21) Appl. No.: 11/832,594

(22) Filed: Aug. 1, 2007

(65) Prior Publication Data

US 2008/0037043 A1 Feb. 14, 2008

Related U.S. Application Data

(63) Continuation of application No. 10/814,536, filed on Mar. 30, 2004, now Pat. No. 7,253,919, which is a continuation-in-part of application No. 09/728,453, filed on Nov. 30, 2000, and a continuation-in-part of application No. 09/728,560, filed on Nov. 30, 2000, now Pat. No. 7,167,191.

(51) Int. Cl.
*G06F 15/00* (2006.01)
*G06K 1/00* (2006.01)

(52) U.S. Cl. ............ 358/1.8; 358/1.15; 358/1.12; 345/173; 709/218; 707/10; 235/462.01; 715/513

(58) Field of Classification Search .......... 358/1.15, 358/1.18; 345/173; 709/218; 707/10; 235/462.01; 715/513, 234

See application file for complete search history.

(56) References Cited

U.S. PATENT DOCUMENTS

| 4,133,007 A | 1/1979 | Wessler et al. |
| 4,205,780 A | 6/1980 | Burns et al. |
| 4,437,378 A | 3/1984 | Ishida et al. |
| 4,619,522 A | 10/1986 | Imai |
| 4,635,132 A | 1/1987 | Nakamura |
| 4,734,898 A | 3/1988 | Morinaga |
| 4,754,485 A | 6/1988 | Klatt |
| 4,807,186 A | 2/1989 | Ohnishi et al. |

(Continued)

FOREIGN PATENT DOCUMENTS

CA 2386829 11/2002

(Continued)

OTHER PUBLICATIONS

Arai, T. et al., "PaperLink: A Technique for Hyperlinking from Real Paper to Electronic Content," CHI 97, Atlanta, GA, Mar. 22-27, 1997, pp. 327-334.

(Continued)

*Primary Examiner*—Edward L Coles
*Assistant Examiner*—Satwant K Singh
(74) *Attorney, Agent, or Firm*—Fenwick & West LLP

(57) ABSTRACT

A system and method for a printer that receives a data containing multimedia information or a pointer to multimedia content and performs various actions in accordance with the received document. The printer may retrieve the multimedia content based on pointers within the document or the document itself may include multimedia content.

10 Claims, 10 Drawing Sheets

U.S. PATENT DOCUMENTS

| | | | |
|---|---|---|---|
| 4,831,610 A | 5/1989 | Hoda et al. | |
| 4,881,135 A | 11/1989 | Heilweil | |
| 4,907,973 A | 3/1990 | Hon et al. | |
| 4,998,215 A | 3/1991 | Black et al. | |
| 5,059,126 A | 10/1991 | Kimball | |
| 5,091,948 A | 2/1992 | Kametani | |
| 5,093,730 A | 3/1992 | Ishii et al. | |
| 5,111,285 A | 5/1992 | Fujita et al. | |
| 5,115,967 A | 5/1992 | Wedekind | |
| 5,136,563 A | 8/1992 | Takemasa et al. | |
| 5,170,935 A | 12/1992 | Federspiel et al. | |
| 5,220,649 A | 6/1993 | Forcier | |
| 5,231,698 A | 7/1993 | Forcier | |
| 5,237,648 A | 8/1993 | Mills et al. | |
| 5,270,989 A | 12/1993 | Kimura | |
| 5,343,251 A | 8/1994 | Nafeh | |
| 5,386,510 A | 1/1995 | Jacobs | |
| 5,428,555 A | 6/1995 | Starkey et al. | |
| 5,432,532 A | 7/1995 | Mochimaru et al. | |
| 5,436,792 A | 7/1995 | Leman et al. | |
| 5,438,426 A | 8/1995 | Miake et al. | |
| 5,444,476 A | 8/1995 | Conway et al. | |
| 5,479,600 A | 12/1995 | Wroblewski et al. | |
| 5,480,306 A | 1/1996 | Liu | |
| 5,485,554 A | 1/1996 | Lowitz et al. | |
| 5,493,409 A | 2/1996 | Maeda et al. | |
| 5,524,085 A | 6/1996 | Bellucco et al. | |
| 5,568,406 A | 10/1996 | Gerber | |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A | 5/1997 | Sugiyama et al. | |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,540 A | 10/1997 | Klotz et al. | |
| 5,682,560 A | 10/1997 | Klotz et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A | 2/1998 | Katsuo et al. | |
| 5,729,665 A | 3/1998 | Gauthier | |
| 5,749,735 A | 5/1998 | Redford et al. | |
| 5,757,897 A | 5/1998 | LaBarbera et al. | |
| 5,761,380 A | 6/1998 | Lewis et al. | |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A | 12/1998 | Tateyama et al. | |
| 5,877,764 A | 3/1999 | Feitelson et al. | |
| 5,884,056 A | 3/1999 | Steele | |
| 5,903,538 A | 5/1999 | Fujita et al. | |
| 5,936,542 A | 8/1999 | Kleinrock et al. | |
| 5,938,727 A | 8/1999 | Ikeda | |
| 5,940,776 A | 8/1999 | Baron et al. | |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,974,189 A | 10/1999 | Nicponski | |
| 5,987,226 A | 11/1999 | Ishikawa et al. | |
| 5,999,173 A | 12/1999 | Ubillos | |
| 6,000,030 A | 12/1999 | Steinberg et al. | |
| 6,006,241 A | 12/1999 | Purnaveja et al. | |
| 6,020,916 A | 2/2000 | Gerszberg et al. | |
| 6,038,567 A | 3/2000 | Young | |
| 6,043,904 A | 3/2000 | Nickerson | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A | 9/2000 | Huberman et al. | |
| 6,118,888 A | 9/2000 | Chino et al. | |
| 6,123,258 A | 9/2000 | Iida | |
| 6,125,229 A | 9/2000 | Dimitrova et al. | |
| 6,138,151 A | 10/2000 | Reber et al. | |
| 6,141,001 A | 10/2000 | Baleh | |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 * | 1/2001 | Venkatraman et al. | 709/218 |
| 6,175,489 B1 | 1/2001 | Markow et al. | |
| 6,189,009 B1 * | 2/2001 | Stratigos et al. | 707/10 |
| 6,193,658 B1 | 2/2001 | Wendelken et al. | |
| 6,199,042 B1 | 3/2001 | Kurzweil | |
| 6,256,638 B1 | 7/2001 | Dougherty et al. | |
| 6,266,053 B1 | 7/2001 | French et al. | |
| 6,296,693 B1 | 10/2001 | McCarthy | |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,302,527 B1 | 10/2001 | Walker | |
| 6,307,956 B1 | 10/2001 | Black | |
| 6,308,887 B1 | 10/2001 | Korman et al. | |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 | 4/2002 | Abgrall | |
| 6,373,585 B1 | 4/2002 | Mastie et al. | |
| 6,375,298 B2 | 4/2002 | Purcell et al. | |
| 6,378,070 B1 | 4/2002 | Chan et al. | |
| 6,381,614 B1 | 4/2002 | Barnett et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,452,615 B1 | 9/2002 | Chiu et al. | |
| 6,466,534 B2 | 10/2002 | Cundiff, Sr. | |
| 6,476,793 B1 | 11/2002 | Motoyama et al. | |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | Fåhraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,535,639 B1 | 3/2003 | Uchihachi et al. | |
| 6,544,294 B1 | 4/2003 | Greenfield et al. | |
| 6,552,743 B1 | 4/2003 | Rissman | |
| 6,556,241 B1 | 4/2003 | Yoshimura et al. | |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,593,860 B2 | 7/2003 | Lai et al. | |
| 6,594,377 B1 | 7/2003 | Kim et al. | |
| 6,611,276 B1 | 8/2003 | Muratori et al. | |
| 6,611,622 B1 | 8/2003 | Krumm | |
| 6,611,628 B1 | 8/2003 | Sekiguchi et al. | |
| 6,625,334 B1 | 9/2003 | Shiota et al. | |
| 6,647,534 B1 | 11/2003 | Graham | |

| | | | | | |
|---|---|---|---|---|---|
| 6,647,535 B1 | 11/2003 | Bozdagi et al. | 2002/0048224 A1 | 4/2002 | Dygert et al. |
| 6,654,887 B2 | 11/2003 | Rhoads | 2002/0051010 A1 | 5/2002 | Jun et al. |
| 6,665,092 B2 | 12/2003 | Reed | 2002/0060748 A1 | 5/2002 | Aratani et al. |
| 6,674,538 B2 | 1/2004 | Takahashi | 2002/0066782 A1 | 6/2002 | Swaminathan et al. |
| 6,678,389 B1 | 1/2004 | Sun et al. | 2002/0067503 A1 | 6/2002 | Hiatt |
| 6,687,383 B1 | 2/2004 | Kanevsky et al. | 2002/0078149 A1 | 6/2002 | Chang et al. |
| 6,700,566 B2 * | 3/2004 | Shimoosawa et al. ....... 345/173 | 2002/0087530 A1 | 7/2002 | Smith et al. |
| 6,701,369 B1 | 3/2004 | Philyaw | 2002/0087598 A1 | 7/2002 | Carro |
| 6,724,494 B1 | 4/2004 | Danknick | 2002/0095501 A1 | 7/2002 | Chiloyan et al. |
| 6,728,466 B1 | 4/2004 | Tanaka | 2002/0099534 A1 | 7/2002 | Hegarty |
| 6,745,234 B1 | 6/2004 | Philyaw et al. | 2002/0101343 A1 | 8/2002 | Patton |
| 6,750,978 B1 | 6/2004 | Marggraff et al. | 2002/0101513 A1 | 8/2002 | Halverson |
| 6,753,883 B2 | 6/2004 | Schena et al. | 2002/0131071 A1 | 9/2002 | Parry |
| 6,771,283 B2 | 8/2004 | Carro | 2002/0131078 A1 | 9/2002 | Tsukinokizawa |
| 6,772,947 B2 | 8/2004 | Shaw | 2002/0134699 A1 | 9/2002 | Bradfield et al. |
| 6,774,951 B2 | 8/2004 | Narushima | 2002/0135800 A1 | 9/2002 | Dutta |
| 6,775,651 B1 | 8/2004 | Lewis et al. | 2002/0137544 A1 | 9/2002 | Myojo |
| 6,807,303 B1 | 10/2004 | Kim et al. | 2002/0140993 A1 | 10/2002 | Silverbrook |
| 6,824,044 B1 | 11/2004 | Lapstun et al. | 2002/0159637 A1 | 10/2002 | Echigo et al. |
| 6,845,913 B2 | 1/2005 | Madding et al. | 2002/0165769 A1 | 11/2002 | Ogaki et al. |
| 6,853,980 B1 | 2/2005 | Ying et al. | 2002/0169849 A1 | 11/2002 | Schroath |
| 6,856,415 B1 * | 2/2005 | Simchik et al. ............ 358/1.15 | 2002/0171857 A1 | 11/2002 | Hisatomi et al. |
| 6,871,780 B2 | 3/2005 | Nygren et al. | 2002/0185533 A1 | 12/2002 | Shieh et al. |
| 6,877,134 B1 | 4/2005 | Fuller et al. | 2002/0199149 A1 | 12/2002 | Nagasaki et al. |
| 6,883,162 B2 | 4/2005 | Jackson et al. | 2003/0002068 A1 | 1/2003 | Constantin et al. |
| 6,886,750 B2 | 5/2005 | Rathus et al. | 2003/0007776 A1 | 1/2003 | Kameyama et al. |
| 6,892,193 B2 | 5/2005 | Bolle et al. | 2003/0014615 A1 | 1/2003 | Lynggaard |
| 6,898,709 B1 | 5/2005 | Teppler | 2003/0024975 A1 | 2/2003 | Rajasekharan |
| 6,904,168 B1 | 6/2005 | Steinberg et al. | 2003/0025951 A1 | 2/2003 | Pollard et al. |
| 6,904,451 B1 | 6/2005 | Orfitelli et al. | 2003/0038971 A1 | 2/2003 | Renda |
| 6,923,721 B2 | 8/2005 | Luciano et al. | 2003/0051214 A1 | 3/2003 | Graham et al. |
| 6,931,594 B1 | 8/2005 | Jun | 2003/0065925 A1 | 4/2003 | Shindo et al. |
| 6,938,202 B1 * | 8/2005 | Matsubayashi et al. ..... 715/234 | 2003/0076521 A1 | 4/2003 | Li et al. |
| 6,946,672 B1 | 9/2005 | Lapstun et al. | 2003/0084462 A1 | 5/2003 | Kubota et al. |
| 6,950,623 B2 | 9/2005 | Brown et al. | 2003/0088582 A1 | 5/2003 | Pflug |
| 6,964,374 B1 * | 11/2005 | Djuknic et al. ......... 235/462.01 | 2003/0093384 A1 | 5/2003 | Durst et al. |
| 6,966,495 B2 | 11/2005 | Lynggaard et al. | 2003/0110926 A1 | 6/2003 | Sitrick et al. |
| 6,983,482 B2 | 1/2006 | Morita et al. | 2003/0117652 A1 | 6/2003 | Lapstun |
| 7,000,193 B1 | 2/2006 | Impink, Jr. et al. | 2003/0121006 A1 | 6/2003 | Tabata et al. |
| 7,023,459 B2 | 4/2006 | Arndt et al. | 2003/0128877 A1 | 7/2003 | Nicponski |
| 7,031,965 B1 | 4/2006 | Moriya et al. | 2003/0146927 A1 | 8/2003 | Crow et al. |
| 7,073,119 B2 * | 7/2006 | Matsubayashi et al. ..... 715/234 | 2003/0160898 A1 | 8/2003 | Baek et al. |
| 7,075,676 B2 * | 7/2006 | Owen ........................ 358/1.18 | 2003/0164898 A1 | 9/2003 | Imai |
| 7,079,278 B2 | 7/2006 | Sato | 2003/0177240 A1 | 9/2003 | Gulko et al. |
| 7,089,420 B1 | 8/2006 | Durst et al. | 2003/0187642 A1 | 10/2003 | Ponceleon et al. |
| 7,092,568 B2 | 8/2006 | Eaton | 2003/0218597 A1 | 11/2003 | Hodzic |
| 7,131,058 B1 | 10/2006 | Lapstun | 2003/0220988 A1 | 11/2003 | Hymel |
| 7,134,016 B1 | 11/2006 | Harris | 2003/0231198 A1 | 12/2003 | Janevski |
| 7,149,957 B2 | 12/2006 | Hull et al. | 2004/0024643 A1 | 2/2004 | Pollock et al. |
| 7,151,613 B1 | 12/2006 | Ito | 2004/0036842 A1 | 2/2004 | Tsai et al. |
| 7,152,206 B1 | 12/2006 | Tsuruta | 2004/0039723 A1 | 2/2004 | Lee et al. |
| 7,162,690 B2 | 1/2007 | Gupta et al. | 2004/0044894 A1 | 3/2004 | Lofgren et al. |
| 7,174,151 B2 | 2/2007 | Lynch et al. | 2004/0049681 A1 | 3/2004 | Diehl et al. |
| 7,181,502 B2 | 2/2007 | Incertis | 2004/0118908 A1 | 6/2004 | Ando et al. |
| 7,196,808 B2 | 3/2007 | Kofman et al. | 2004/0125402 A1 | 7/2004 | Kanai et al. |
| 7,215,436 B2 | 5/2007 | Hull et al. | 2004/0128514 A1 | 7/2004 | Rhoads |
| 7,228,492 B1 | 6/2007 | Graham | 2004/0128613 A1 | 7/2004 | Sinisi |
| 7,263,659 B2 | 8/2007 | Hull et al. | 2004/0143459 A1 | 7/2004 | Engleson et al. |
| 7,263,671 B2 | 8/2007 | Hull et al. | 2004/0143602 A1 | 7/2004 | Ruiz et al. |
| 7,280,738 B2 | 10/2007 | Kauffman et al. | 2004/0150627 A1 | 8/2004 | Luman et al. |
| 7,298,512 B2 | 11/2007 | Reese et al. | 2004/0156616 A1 | 8/2004 | Strub et al. |
| 7,363,580 B2 * | 4/2008 | Tabata et al. ................ 715/234 | 2004/0167895 A1 | 8/2004 | Carro |
| 2001/0003846 A1 | 6/2001 | Rowe et al. | 2004/0184064 A1 | 9/2004 | TaKeda et al. |
| 2001/0017714 A1 | 8/2001 | Komatsu et al. | 2004/0207876 A1 | 10/2004 | Aschenbrenner et al. |
| 2001/0037408 A1 | 11/2001 | Thrift et al. | 2004/0215470 A1 | 10/2004 | Bodin |
| 2001/0052942 A1 | 12/2001 | MacCollum et al. | 2004/0229195 A1 | 11/2004 | Marggraff et al. |
| 2002/0001101 A1 | 1/2002 | Hamura et al. | 2004/0240541 A1 | 12/2004 | Chadwick et al. |
| 2002/0004807 A1 | 1/2002 | Graham et al. | 2004/0249650 A1 | 12/2004 | Freedman et al. |
| 2002/0006100 A1 | 1/2002 | Cundiff Sr, et al. | 2005/0038794 A1 | 2/2005 | Piersol |
| 2002/0010641 A1 | 1/2002 | Stevens et al. | 2005/0064935 A1 | 3/2005 | Blanco |
| 2002/0011518 A1 | 1/2002 | Goetz et al. | 2005/0068569 A1 | 3/2005 | Hull et al. |
| 2002/0015066 A1 | 2/2002 | Siwinski et al. | 2005/0068581 A1 | 3/2005 | Hull et al. |
| 2002/0023957 A1 | 2/2002 | Michaelis et al. | 2005/0083413 A1 | 4/2005 | Reed et al. |

| | | | |
|---|---|---|---|
| 2005/0125717 | A1 | 6/2005 | Segal et al. |
| 2005/0149849 | A1 | 7/2005 | Graham et al. |
| 2005/0213153 | A1 | 9/2005 | Hull et al. |
| 2005/0216838 | A1 | 9/2005 | Graham |
| 2005/0216852 | A1 | 9/2005 | Hull et al. |
| 2006/0043193 | A1 | 3/2006 | Brock |
| 2006/0136343 | A1 | 6/2006 | Coley et al. |
| 2006/0171559 | A1 | 8/2006 | Rhoads |
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0234196 | A1 | 10/2007 | Nicol et al. |
| 2007/0268164 | A1 | 11/2007 | Lai et al. |
| 2008/0037043 | A1 | 2/2008 | Hull et al. |

FOREIGN PATENT DOCUMENTS

| | | |
|---|---|---|
| CN | 1352765 A | 6/2002 |
| CN | 1097394 C | 12/2002 |
| EP | 1079313 A2 | 2/2001 |
| EP | 1133170 A2 | 9/2001 |
| WO | WO 99/18523 | 4/1999 |
| WO | WO 02/082316 A1 | 10/2002 |

OTHER PUBLICATIONS

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3% . . . >.

Configuring A Printer (NT), Oxford Computer Support [online] [Retrieved on Nov. 13, 2003] Retrieved from the Internet<URL: http://www.nox.ac.uk/cehoxford/ccs/facilities/printers/configt.htm>.

Dimitrova, N. et al., "Applications of Video-Content Analysis and Retrieval," IEEE Multimedia, Jul.-Sep. 2002, pp. 42-55.

"DocumentMall Secure Document Management" [online], DocumentMall. [retrieved on Mar. 9, 2004). Retrieved from the Internet <URL: http://www.documentmall.com>.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Girgensohn, Andreas et al., "Time-Constrained Keyframe Selection Technique," Multimedia Tools and Applications (2000), vol. 11, pp. 347-358.

Gopal, S. et al., "Load Balancing in a Heterogeneous Computing Environment," Proceedings of the Thirty-First Hawaii International Conference on System Sciences, Jan. 6-9, 1998.

Graham, J. et al., "A Paper-Based Interface for Video Browsing and Retrieval," ICME '03, Jul. 6-9, 2003, pp. 749-752, vol. 2.

Graham, Jamey et al., "The Video Paper Multimedia Playback System," Proceedings of the 11th ACM International Conference on Multimedia (Nov. 2003), pp. 94-95.

Graham, J. et al., "Video Paper: A Paper-Based Interface for Skimming and Watching Video," ICCE '02, Jun. 18-20, 2002, pp. 214-215.

Gropp, W. et al., "Using MPI-Portable Programming with the Message Passing Interface," copyright 1999, pp. 35-42, second edition, MIT Press.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

Klemmer, S.R. et al., "Books With Voices: Paper Transcripts as a Tangible Interface to Oral Histories," CHI Letters, Apr. 5-10, 2003, pp. 89-96, vol. 5, Issue 1.

"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL: http://www.maxell.co.jp/products/consumer/rabel_card/>.

Lamming, M. et al., "Using Automatically Generated Descriptions of Human Activity to Index Multi-media Data," IEEE Multimedia Communications and Applications IEEE Colloquium, Feb. 7, 1991, pp. 1-2.

"Microsoft Powerpoint—Wikipedia, the free encyclopedia," Wikimedia Foundation, Inc., [online] [Retrieved on Nov. 7, 2006] Retrieved from the Internet<URL:http://en.wikipedia.org/wiki/Microsoft_PowerPoint>.

Minami, K. et al., "Video Handling with Music and Speech Detection," IEEE Multimedia, Juy-Sep. 1998, pp. 17-25.

Movie-PhotoPrint by Canon, [online] [Retrieved on Nov. 11, 2003]. Retrieved from the Internet<URL:http://cweb.canon.jp/hps/guide/rimless.html>.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

"PostScript Language Document Structuring Conventions Specification", Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html >.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 Scan Talk [online] (date unknown). Retrieved from the Internet<URL: http://homepage2.nifty.com/vasolza/ScanTalk.htm>.

"Seiko Instruments USA, Inc.—Business and Home Office Produsts" online, date unknown, Seiko Instruments USA, Inc., [retrieved on Jan. 25, 2005]. Retrieved from the Internet: <URL: http://www.siibusinessproducts.com/products/link-ir-html>.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

"Tasty FotoArt" [online], date unknown, Tague Technologies, Inc., [retrieved on Mar. 8, 2005]. Retrieved from the Internet: <URL: http//www.tastyfotoart.com>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Chinese Application No. 2004100849823 Office Action, Jun. 1, 2007, 24 pages.

Chinese Application No. 2004100897988 Office Action, Apr. 6, 2007, 8 pages.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

U.S. Appl. No. 10/814,842, filed Mar. 30, 2004, Hull et al.
U.S. Appl. No. 10/814,580, filed Mar. 30, 2004, Piersol et al.
U.S. Appl. No. 10/660,867, filed Sep. 12, 2003, Erol et al.

Brown et al., "A Diary Study Of Information Capture In Working Life," Proceedings Of ACM CHI 2000 Conference On Human Factors In Computing Systems, 2000, pp. 438-445, vol. 1.

Erol, Berna et al., "Linking Multimedia Presentations With Their Symbolic Source Documents: Algorithm And Applications," ACM Multimedia '03, Nov. 2-8, 2003, pp. 498-507, Berkeley, CA.

Erol, Berna et al., "Prescient Paper: Multimedia Document Creation With Document Image Matching," 17$^{th}$ International Conference On Pattern Recognition, Aug. 2004, 4 pages, Cambridge, U.K.

Erol, Berna et al, "Retrieval Of Presentation Recordings With Digital Camera Images," IEE Conference On Computer Vision And Pattern Recognition (CVPR), Jun. 27-Jul. 2, 2004, 2 pages, Washington, D.C.

Hardman, L. et al., "Integrating the Amsterdam Hypermedia Model with the Standard Reference Model for Intelligent Multimedia Presentation Systems,"Computer Standards & Interfaces, 1997, pp. 497-507, vol. 18.

Karasik, D. "Image Processing in Perl Graphic Applications," Google, Apr. 2, 2003, pp. 1-12.

Lauesen, S., "User Interface Design: A Software Engineering Perspective," 2005, 28 pages.

Lienhart, Rainer et al., "Localizing And Segmenting Text In Images And Videos," IEEE Transactions On Circuits And Systems For Video Technology, Apr. 2002, pp. 256-268, vol. 12, No. 4.

"Microsoft Powerpoint—Wikipedia, the free encyclopedia,"Wikimedia Foundation, Inc., [online] [Retrieved on Nov. 7, 2006] Retrieved from the internet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Srihari, S.N. et al., "Name And Address Block Reader System For Tax Form Processing," IEEE, 1995, pp. 5-10.

U.S. Appl. No. 10/814,932, filed Mar. 30, 2004.
U.S. Appl. No. 10/814,751, filed Mar. 30, 2004.
U.S. Appl. No. 10/813,847, filed Mar. 30, 2004.
U.S. Appl. No. 10/814,931, filed Mar. 30, 2004.
U.S. Appl. No. 10/814,948, filed Mar. 30, 2004.
U.S. Appl. No. 10/814,386, filed Mar. 30, 2004.
U.S. Appl. No. 10/814,700, filed Mar. 30, 2004.
U.S. Appl. No. 10/814,500, filed Mar. 30, 2004.
U.S. Appl. No. 10/814,845, filed Mar. 30, 2004.
U.S. Appl. No. 09/714,785, filed Nov. 15, 2000.

Boreczky, J. et al., "An Interactive Comic Book Presentation for Exploring Video," CHI Letters, Apr. 1-6, 2000, pp. 185-192, vol. 2, Issue 1.

Buchanan, M.C. et al., "Multimedia Documents as User Interfaces," INTERCHI '93, Amsterdam, The Netherlands, Apr. 24-29, 1993, pp. 527-528.

Harada, K. et al., "Anecdote: A Multimedia Storyboarding System with Seamless Authoring Support," ACM Multimedia '96, Boston, MA, 1996, pp. 341-351.

Mackay, W. et al., "Augmenting Reality: Adding Computational Dimensions to Paper," Communications of the ACM, Jul. 1993, pp. 96-97, vol. 36, No. 7.

Mackay, W. et al., "Video Mosaic: Laying Out Time in a Physical Space," Multimedia '94, San Francisco, CA, Oct. 1994, pp. 165-172.

Makedon, F. et al., "Multimedia Authoring, Development Environments and Digital Video Editing," Dartmouth College Technical Report, PCS-TR94-231, 2001, pp. 1-24.

Nelson, L. et al, "Palette: A Paper Interface for Giving Presentations," CHI '99, May 1999, pp. 1-8.

Roschelle, J. et al., "VideoNoter: A Productivity Tool for Video Data Analysis,"Behavior Research Methods, Instruments & Computers, 1991, pp. 219-224, vol. 23, No. 2.

Tonomura, Y. et al., "VideMAP and VideoSpaceIcon," INTERCHI '93, Amsterdam, The Netherlands, Apr. 24-29, 1993, pp. 131-136 and 544.

Wellner, P., "Interacting with Paper on the DigitalDesk," Communications of the ACM, Jul. 1993, pp. 87-96, vol. 36, No. 7.

* cited by examiner

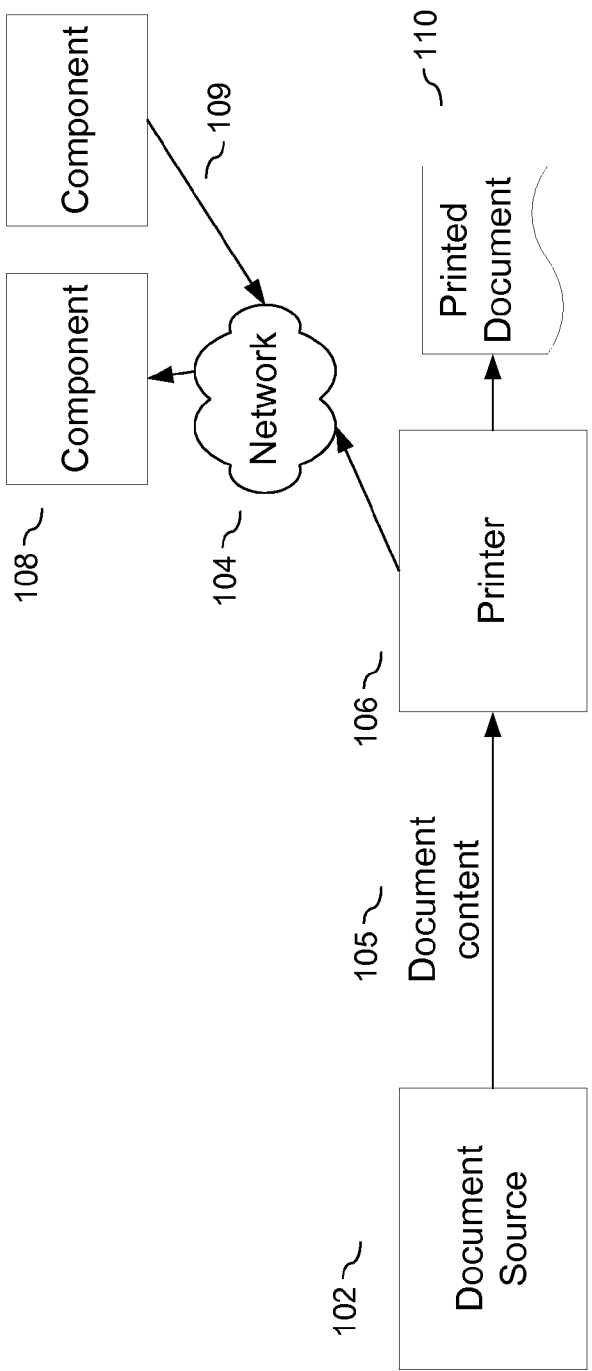
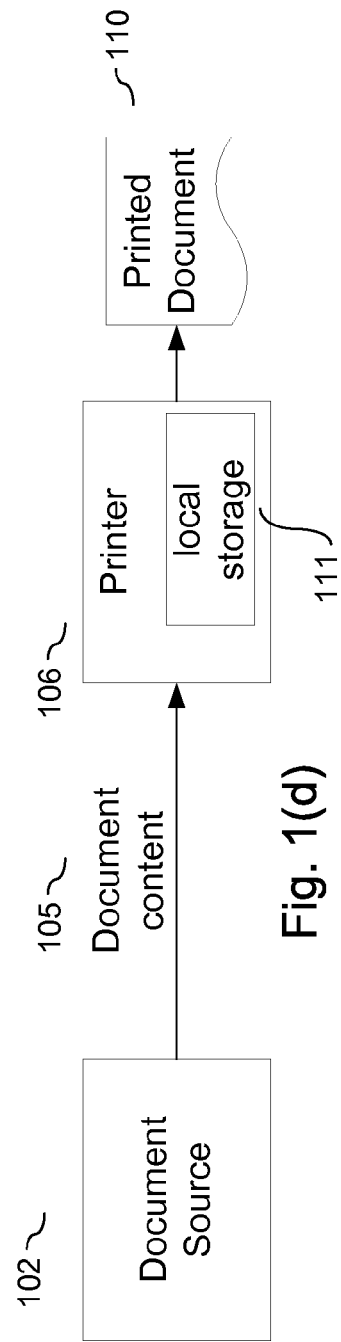
Fig. 1(c)
Fig. 1(d)

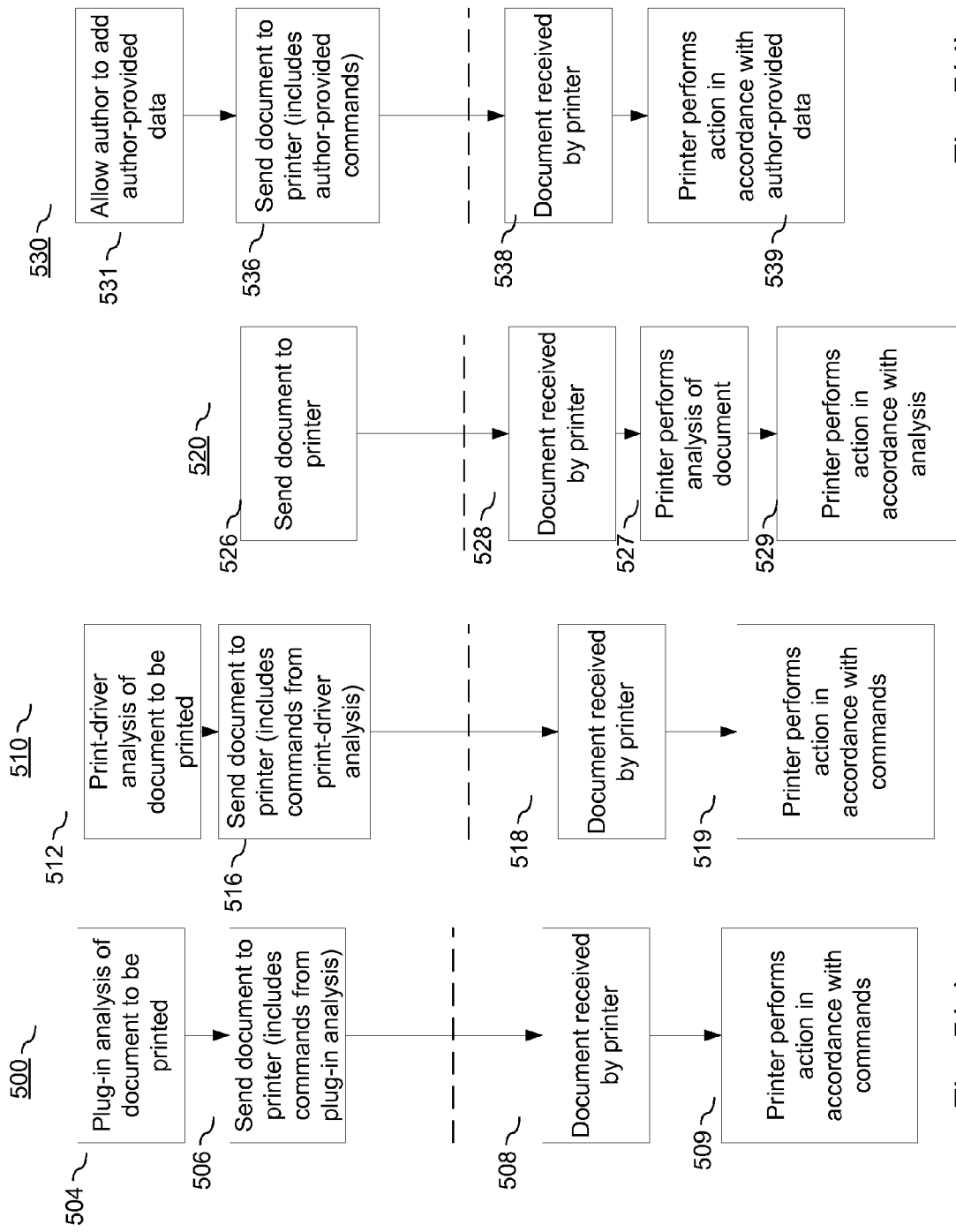

PRINTER WITH EMBEDDED RETRIEVAL AND PUBLISHING INTERFACE

CROSS-REFERENCES TO RELATED APPLICATIONS

The present application is a continuation of U.S. patent application Ser. No. 10/814,536, filed Mar. 30, 2004, entitled "Printer with Embedded Retrieval and Publishing Interface," now U.S. Pat. No. 7,253,919, which is a continuation-in-part of U.S. patent application Ser. No. 09/728,453, filed Nov. 30, 2000, entitled "Techniques for Receiving Information During Multimedia Presentations and Communicating the Information," and U.S. patent application Ser. No. 09/728,560, filed Nov. 30, 2000, entitled "Techniques for Capturing Information During Multimedia Presentations, now U.S. Pat. No. 7,167,191, all of which are herein incorporated by reference in their entireties.

The following patent applications are related to the present application and are incorporated by reference herein in their entirety:

1) U.S. patent application Ser. No. 10/814,931, filed Mar. 30, 2004, of Hart et al., entitled "Printer Having Embedded Functionality for Printing Time-Based Media."
2) U.S. patent application Ser. No. 10/814,700, filed Mar. 30, 2004, of Hart et al., entitled "Printer User Interface."
3) U.S. patent application Ser. No. 10/814,932, filed Mar. 30, 2004, of Hart et al., entitled "Printer With Hardware and Software Interface for Media Devices."
4) U.S. patent application Ser. No. 10/001,895, "(Video Paper) Paper-based Interface for Multimedia Information," filed Nov. 19, 2001.
5) Application Ser. No. 10/001,849, "(Video Paper) Techniques for Annotating Multimedia Information," filed Nov. 19, 2001.
6) Application Ser. No. 10/001,893, "(Video Paper) Techniques for Generating a Coversheet for a paper-based Interface for Multimedia Information," filed Nov. 19, 2001.
7) Application Ser. No. 10/001,894, "(Video Paper) Techniques for Retrieving Multimedia Information Using a Paper-Based Interface," filed Nov. 19, 2001.
8) Application Ser. No. 10/001,891, "(Video Paper) Paper-based Interface for Multimedia Information Stored by Multiple Multimedia Documents," filed Nov. 19, 2001.
9) Application Ser. No. 10/175,540, "(Video Paper) Device for Generating a Multimedia Paper Document," filed Jun. 18, 2002.
10) Application Ser. No. 10/645,821, "(Video Paper) Paper-Based Interface for Specifying Ranges CIP," filed Aug. 20, 2003.

BACKGROUND OF THE INVENTION

1. Field of the Invention

The present invention relates to document printers and, more specifically, to systems and methods that receive a document containing multimedia or pointers to multimedia and act in accordance with the received document.

2. Description of the Background Art

Conventional printers receive a representation of a document and then print the document in paper form. Generally, a conventional document will contain text and possibly some pictures or static graphics. For example, a printer may print a sales report or a snapshot of a web page. If the document is part of a larger multimedia presentation, however, conventional printers do not adequately represent the complete presentation. For example a sales report might be part of an animated computer slide show. As another example, a web page might incorporate an animated picture. As a third example, a pointer or local address might point to a digital recording of a television program. Conventional printers can only print a captured snapshot of such multimedia presentations.

Today, as more and more electrical databases and computer networks are interconnected, people often have multiple data systems and destinations in which to store information. For example, a person may receive an email containing information and/or a multimedia attachment that he wants to retain. The person may want to print some or all of the information. The person may further want to add the information to a database or to send the information to other people or destinations or to add the information to a web page. Currently, the person will need to execute several different software programs and will need to type multiple commands into the programs. He may also need to re-enter the information into one or more programs. This is not efficient and is prone to human error, since human beings occasionally forget to perform one of more of the tasks usually associated with a received document and are also prone to typographical errors.

What is needed is a printer and method that can capture and print more of the true flavor of a multimedia presentation or multimedia document.

SUMMARY OF THE INVENTION

The present invention overcomes the deficiencies and limitations of the prior art by providing a system and method for a printer that can receive pointers or links to multimedia data and trigger an action in response. For example, one embodiment of the printer receives multimedia information such as a pointer to multimedia content, then retrieves the multimedia content and prints a document representing the multimedia content. Another embodiment further stores the retrieved multimedia content in a database or in local storage of the printer. Another embodiment of a printer gathers multimedia content that is accessible to it (e.g., via a network or in its local storage) and prints a summary document of the gathered multimedia content.

The action performed by the printer preferably is based on content of the document received by the printer. This content can include printable and non-printable data. In certain embodiments, the document is analyzed by a data processing system before it is sent to be printed and additional data is added to or coupled with the document. In one embodiment, an author or other user provides additional information, such as the name of a database, a special print command, or a pointer to a web page. In another embodiment, plug-in software on the data processing system analyzes the document and provides additional information about its content. In another embodiment, printer driver software on the data processing system analyzes the document and provides additional information about its content. In yet another embodiment, the printer analyzes the document after the printer receives it. In certain embodiments, the printer retrieves multimedia data in accordance with the document and prints a document in accordance with the document received.

Certain embodiments retrieve multimedia data and store it locally or on a web site. This could be used to "print" a URL that points to an mp3 audio file or a video file. Because it might take a long time to download the data, the user would be happy if the printer takes care of that in the background. Subsequently, the user can view a listing of the audio and video files on a web page served by the printer and play selected files on demand. That web page could also allow the user to generate video paper for those files. This could result in the printing of a paper document, but it could also provide an electronic representation (e.g., pdf) for the video paper. The bar codes would refer to the location of the multimedia after it was retrieved by the printer.

In other embodiments, the multimedia data itself is sent to the printer in conjunction with or as a part of the document. In some embodiments, the received pointers or multimedia data must be processed before printing can occur. Certain embodiments also store the retrieved multimedia data in local storage or in a database.

BRIEF DESCRIPTION OF THE DRAWINGS

The invention is illustrated by way of example, and not by way of limitation in the figures of the accompanying drawings in which like reference numerals refer to similar elements.

FIG. 1(c) is a block diagram showing a system usable in connection with the present invention.

FIG. 1(d) is a block diagram showing a system usable in connection with the present invention.

FIG. 5(a) is a flowchart corresponding to an embodiment of FIG. 3(a).

FIG. 5(b) is a flowchart corresponding to an embodiment of FIG. 3(b).

FIG. 5(c) is a flowchart corresponding to an embodiment of FIG. 3(c).

FIG. 5(d) is a flowchart corresponding to an embodiment of FIG. 3(d).

DETAILED DESCRIPTION OF PREFERRED EMBODIMENTS

Figure 1A:
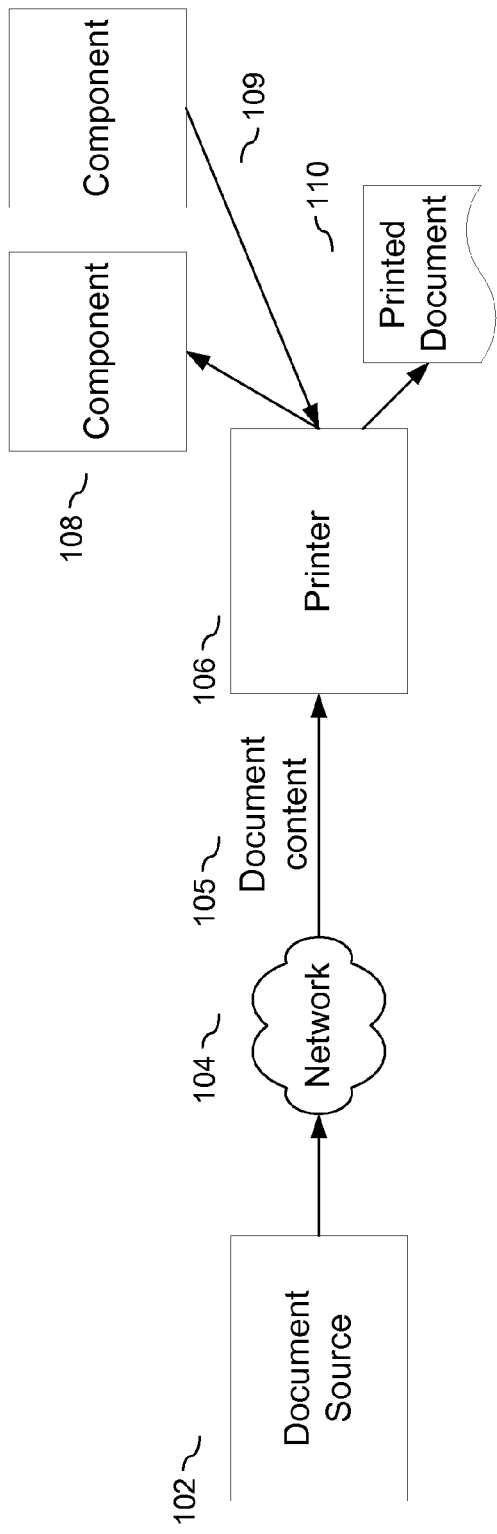
FIG. 1(a) is a block diagram showing a system usable in connection with the present invention.

A printer and associated method that can retrieve and print a representation of multimedia is described. For example, a printer receives a document containing or referencing audio and/or video multimedia data. The printer then produces a printed document in accordance with the received document. In this application, the term multimedia can include any type of multimedia content such as, but not limited to, graphics (JPEGs, Gifs, etc), animation, video from any source and in any format, photographs, scans, audio from any source and in any format, and combined forms such as Macromedia Flash files, or static compound documents whose contents include embedded video, audio, or animation. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment," "certain embodiments" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a data processor memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages and Page Description Languages (PDLs) may be used to implement the teachings of the invention as described herein.

Moreover, the present invention is claimed below operating on or working in conjunction with an information system. Such an information system as claimed may be the entire messaging system as detailed below in the preferred embodiment or only portions of such a system. Thus, the present invention is capable of operating with any information system from those with minimal functionality to those providing all the functionality disclosed herein.

FIG. 1(a) is a block diagram showing a system usable in connection with the present invention. A document having document content 105 is sent from a document source 102 to a printer 106. As used herein, the term "document content" refers to anything in the print stream sent to the printer, including both printing and non-printing data. A document can have any appropriate format and is any print stream or command stream that describes a page, including for example, PDL, ASCII text, HTML, etc.

In the Figure, the document is sent over a network 104, such as the Internet, an intranet, a wireless connection, a wide area network, or the like. Printer 106 receives the document and performs an action based on the content of the document. One example of such an action is to create and print a document 110 summarizing the multimedia content pointed to by the document. In this case, the printer would first retrieve the content. Another example of such an action is to create and print a document summarizing multimedia information or content that is contained within the document. The printer may also perform additional actions, such as entering data in a database, sending a notification or confirmation, adding data to a web page, etc. In this example, printer 106 retrieves data from component 109 and stores data on component 108. Examples of actions performed in accordance with content of the document are discussed in further detail below.

Figure 1B:
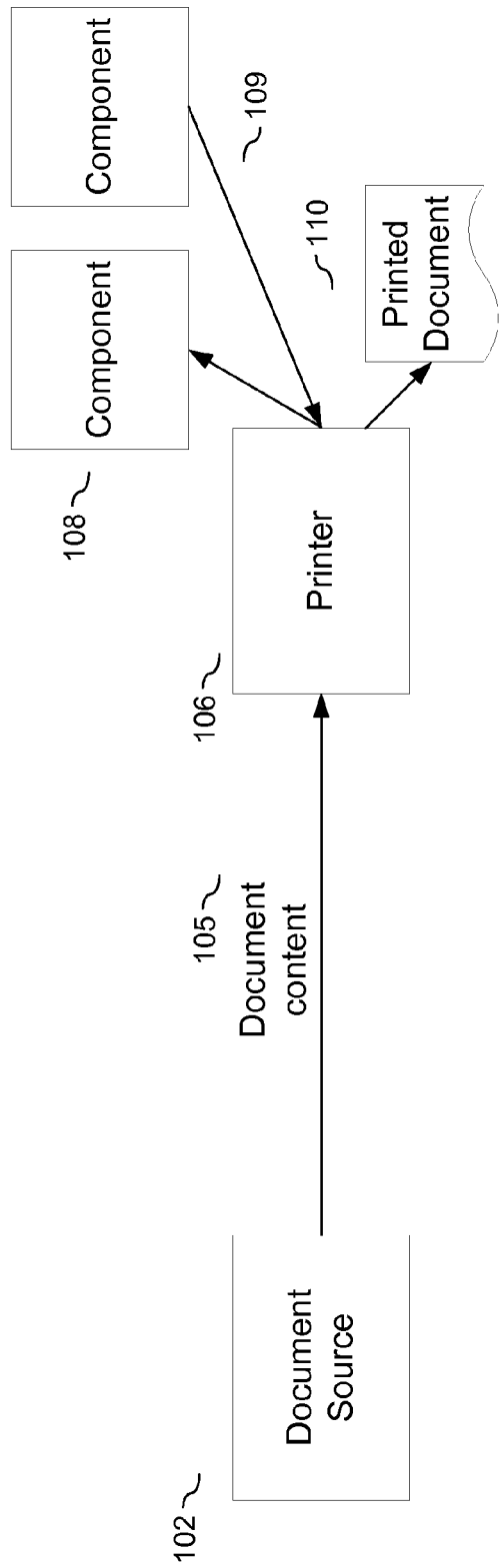
FIG. 1(b) is a block diagram showing a system usable in connection with the present invention.

FIG. 1(b) is a block diagram showing a system usable in connection with the present invention. In this example, document source 102 is connected to printer 106 without a network connection. Similarly, printer 106 is connected to components 108 and 109 without a network connection. In this example, printer 106 retrieves data from component 109 and stores data on component 108.

FIG. 1(c) is a block diagram showing a system usable in connection with the present invention. In this example, printer 106 is connected to components 108 and 109 using a network connection through network 104. One or both of components 108 and 109 can be so connected. Network 104 can be any network, such as the Internet, an intranet, a wireless connection, a wide area network, or the like.

FIG. 1(d) is a block diagram showing a system usable in connection with the present invention. In this example, printer 106 contains local storage 111, such as an internal memory and/or a database. Multimedia content pointed to by or contained in document content is retrieved if necessary and stored in storage 111.

Figure 1E:
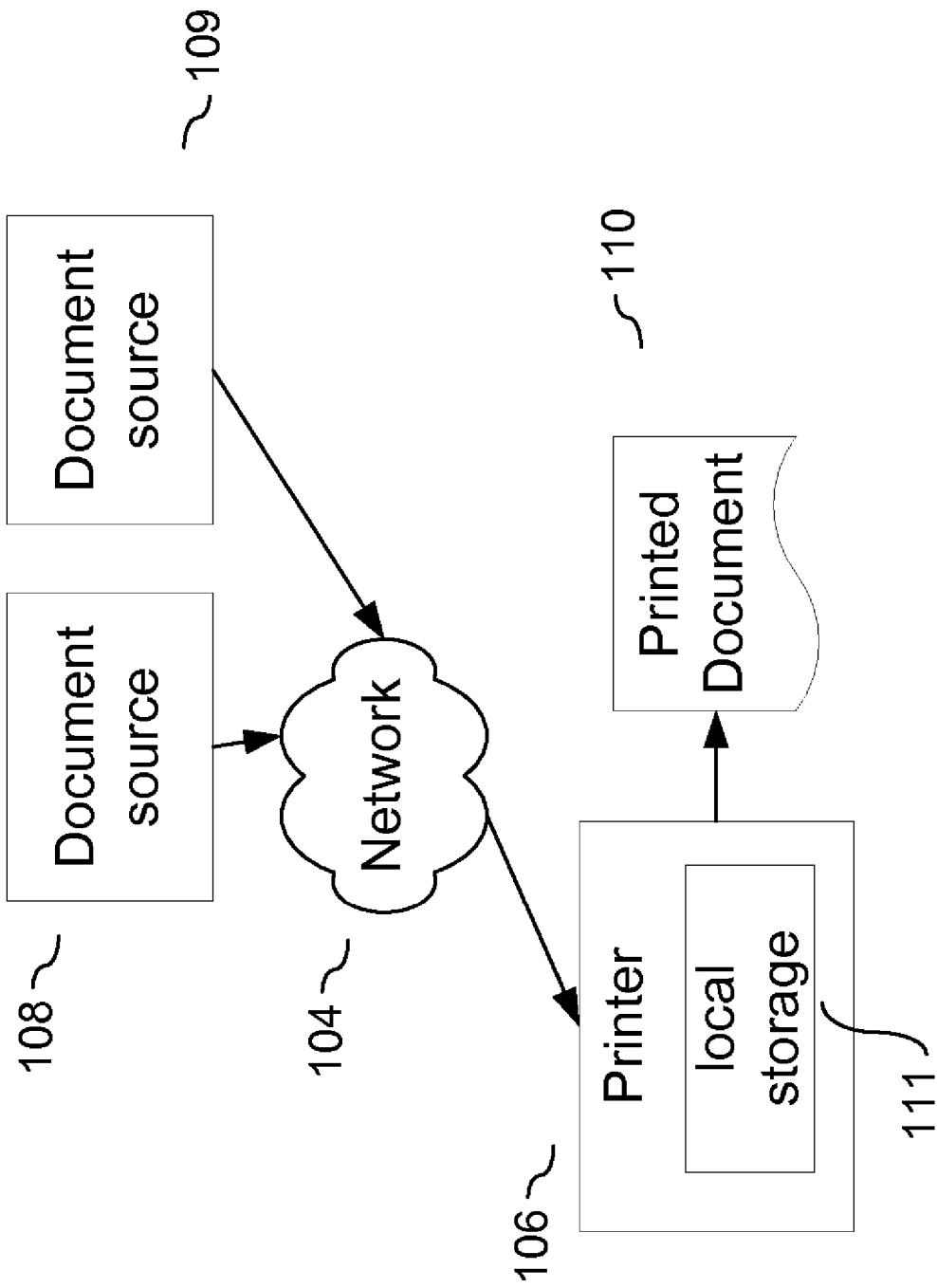
FIG. 1(e) is a block diagram showing a system usable in connection with the present invention.

FIG. 1(e) is a block diagram showing a system usable in connection with the present invention. In this example, printer 106 accesses multimedia content stored in a network or stored in local storage 111 connected to or within the printer. Printer 106 may take this action in response to a command in a received document or without receipt of an explicit user command. After printer 106 gathers accessible multimedia content and/or information about the content, the printer creates and prints (or stores) a summary of the accessible multimedia data.

It will be understood that the system configurations shown in FIGS. 1(a)-1(e) are examples only and are included to show some configurations usable with the present invention. It will be understood that other configurations are possible. For example, the connections between the document source and the printer and between the printer and components 108 and 109 can both be network connections.

Figure 2:
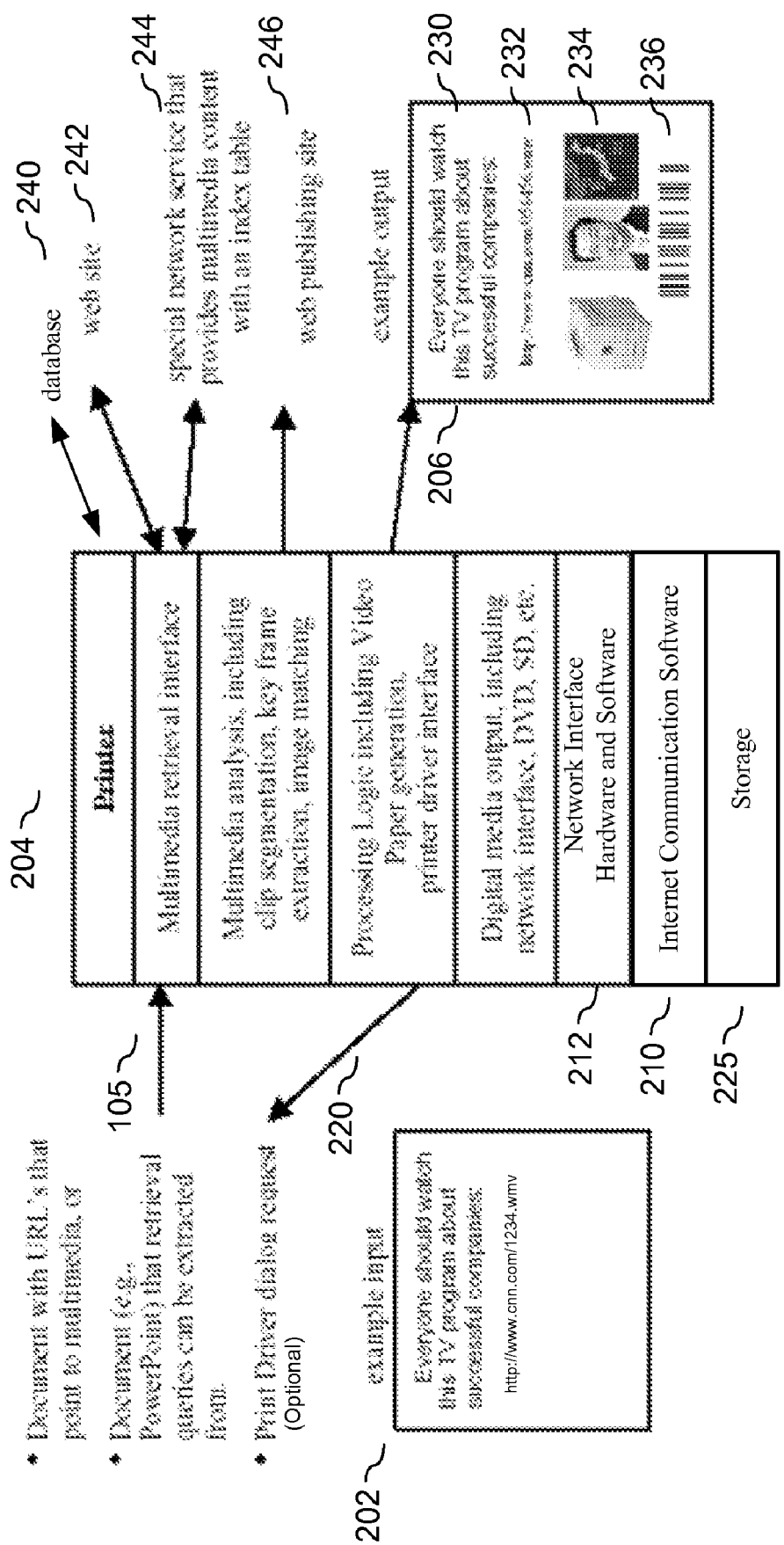
FIG. 2 shows an embodiment of the present invention for printing a PDF form and making an entry based on content of the form into a database.

FIG. 2 shows an embodiment of the present invention in which a printer 204 receives a document 202 and produces a printed document 206. In this example, document 202 includes text ("Everyone should watch this TV program about successful companies:") and a pointer to multimedia content (http://www.cnn.com/1234.wmv). A pointer might be part of a text document or part of a more complex document, such as a PowerPoint presentation that the pointer can be extracted from. A URL is an example of a multimedia pointer. Here, the pointer links to a video clip on the Word Wide Web. Printer 204 detects and/or extracts the URL and retrieves the video clip pointed to by the URL. Other pointers might point, for example, into a database or indexed list of documents or into data on an intranet or other local storage medium. In the example, printer 204 extracts key frames 234 from the video referenced by the pointer and prints them in document 206, together with a pointer 236 to local storage that contains the retrieved video clip. In this example, the printed document also prints the text 230 that was originally part of document 202 and the URL itself 232. Here, for example, the printer stores the retrieved video clip in a cache memory 225 of the printer. Such a cache may be, for example, internal to the printer, local to the printer (such as a hard drive or other local storage device), or could be connected to the printer in any known and appropriate manner.

In FIG. 2, the pointer 236 to local storage takes the form of a bar code 236 that is a part of the printed document 206. This bar code refers to a location of a cached video clip. In other embodiments, the bar code might refer to an original location of the clip or to a location of the printed key frames.

It should be noted that scanning the bar code 236 will enable a data processing system (not shown) to access the local cached copy of the data even if the original copy on the Web is removed for some reason. Thus, for example, a human being could rapidly read through document 206 and many similar documents. The human could then cause a data processing system (such as a hand-held bar code reader) to scan the bar code and immediately begin playing the video clip on an associated display. This would present a way for many people to inexpensively look through documents representing stored video clips and then to play or copy the clips that they desired. Storing pointers to video clips as paper documents also has an advantage because paper is long lasting and does not require any software or hardware for viewing. The term "printed document" and "printable document" as used herein is not, however, limited to paper documents. A printer in accordance with the present invention could also output other types of outputs to summarize multimedia inputs.

Another embodiment embeds extra data (for example, the video clip itself) in the print stream (over and above what is needed to print the document). The printer 204 caches the data and creates a paper-based summary as appropriate.

In the example of FIG. 2, the printer 204 may initiate a dialog with a print driver 220. Such interactive printing is contained in certain embodiments of the present invention and not in others. It is discussed in more detail elsewhere in this application.

In the example of FIG. 2, the printer 204 includes a multimedia retrieval interface. This interface may be implemented as hardware and/or software. Through it, the printer communicates with sites on the network that provide multimedia content. Such an interface can include, for example, an interface to a locally stored index table. When printer 204 receives a document, it determines whether the document it receives matches a document in the index.

In the example of FIG. 2, printer 204 further includes multimedia analysis software, such as software to perform clip segmentation, key frame extraction, and image matching. In the example of FIG. 2, printer 204 further includes processing logic that may be implemented as software and/or hardware and that includes video paper generation. Video paper and audio paper are a paper-based interface for audio and video data. Examples of video and audio paper are described in the following documents, which are herein incorporated by reference in their entirety.

Graham and Hull, "Video Paper: A Paper-Based Interface for Skimming and Watching Video," 2002 International Conference on Consumer Electronics, June 16-18, Los Angeles, Calif.

Graham and Hull, "A Paper-Based Interface for Video Browsing and Retrieval," 2003 IEEE Conf. On Multimedia and Expo (ICME, Jul. 6-9, 2003, Baltimore, Md.

Hull, Erol, Graham, and Lee, "Visualizing Multimedia Content on Paper Documents: Components of Key Frame Selection for Video Paper," Proceedings of the Seventh International Conf. On Document Anlaysis and Recognition, ICDAR 2003.

Graham, Erol, Hull, and Lee, "The Video Paper Multimedia Playback System," MM 2003, Nov. 2-8, 2003, Berkeley, Calif., ACM 1-158113-722-2/03/0011.

In the example of FIG. 2, printer 204 further includes a printer driver interface to interface with a printer driver in a video source (such as a user's data processing system). In one embodiment, the processing logic interacts 220 with the user through a print driver dialog and generates video paper.

In the example of FIG. 2, printer 204 further includes hardware and/or software to perform digital media output, including a network interface to read and write media including, for example, DVDs, SDs, a network interface card, etc.

In various embodiments, printer 204 communicates over a network, although printer 204 could also have a direct connection to the various components shown. For example, a database can be external or internal to printer 204. In this example, printer 204 includes network interface hardware and software 212 required to communicate over a network. Printer 204 further includes Internet communication software 210 that creates and executes commands to communicate with the database. These commands are, for example, SQL commands, http commands, or similar commands, depending on the nature of database 240.

In the example of FIG. 2, printer 204 performs additional actions besides printing document 206. In the example, printer 204 retrieves data from a web page or site 242 and stores data relating to the received document 202 in a database 240. It should be noted that other embodiments may additionally create web pages 246 and retrieve multimedia content or information from database 240. Other embodiments might store and/or retrieve data to and from a web site 242. Other embodiments might store and/or retrieve data from a web-publishing site 246, such as www.document-mall.com.

FIGS. 3(a)-3(d) show further implementations of a printer in accordance with the present invention. It will be understood that the components of these figures can be connected with or without a network connection and that any connection method enabling the communication described below falls within the sprit and scope of the present invention.

Application Plug-In, Simple Document Processing by Printer

Figure 3A:
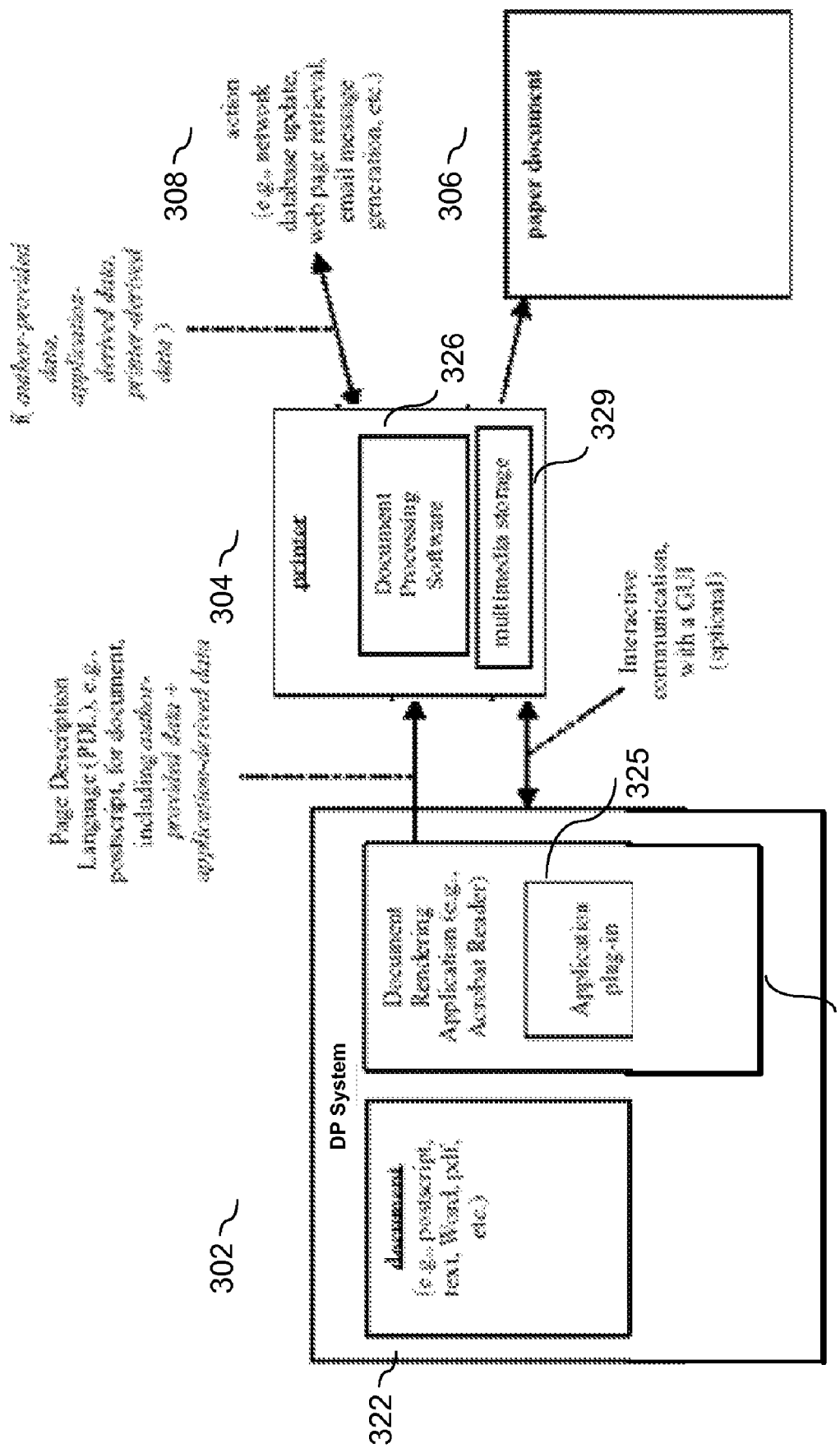
FIG. 3(a) shows a first embodiment of the present invention for printing a paper document.

FIG. 3(a) shows a first embodiment of the present invention for printing a paper document 306 and optionally performing an action 308. FIG. 5(a) shows a flow chart of a method used by this system. In FIG. 3(a), a data processing system 302 communicates with a printer 304. Data processing system 302 includes an initial copy of the document to be printed 322. This document 322 can have any appropriate format, including but not limited to ACSII text, Postscript, Microsoft Word, Adobe's PDF format, etc. (Postscript is a trademark of Adobe Systems Incorporated). This document optionally includes author-provided data, as discussed below. Data processing system 302 also includes a document rendering application 324, such as Acrobat Reader (available from Adobe Systems Incorporated). In this example, document rendering application 324 includes an application plug-in 325. Application plug-in 325, inspects every document printed by document rendering application 324 and preferably performs the following (see 504):

determines whether a retrieval query should be added to the document. For example, a plug-in searches the document for URLs that point to video and embeds them in the PDL sent to the printer. As another example, the plug-in 325 can construct an explicit query, such as a conjunction of pairs of adjacent words in the document that could be applied to a database of stored PowerPoint recordings that are created by a system (that we call the Presentation Recorder) such as the one described in U.S. patent application Ser. No. 09/728,453, filed Nov. 30, 2000, and U.S. patent application Ser. No. 09/728,560, filed Nov. 30, 2000, entitled "Techniques for Capturing Information During Multimedia Presentations," both of which are herein incorporated by reference in their entirety. The presentation recorder saves images of presentation slides together with audio and video of a person describing those presentation slides. The audio and video are time-stamped so that a user can retrieve and replay the multimedia associated with any particular slide. Each slide image is OCR'd and the results are stored in a full text index. In the present invention, a PowerPoint plug-in could create queries to such a full text index from each slide. Those queries would be embedded in the comments of the pdf file and the printer would apply them to the Presentation Recorders that it knows about. If it finds a matching recording, the printer would retrieve the multimedia, store it on the printer, and inform the user that this was done. The printer could also print a video paper representation for that data. In some embodiments, the plug-in retrieves and transmits multimedia data to the printer (e.g., audio and video clips are added to the PDL file. These would conventionally be classified as non-printing data since conventional printers cannot print audio or video.

Data processing system 302 then sends information to the printer using a format such as Postscript (see 506). This information is termed "Page Description Language" (PDL) because it describes the appearance and characteristics of a document to be printed. In this example, the PDL includes data in the original document to be printed and data derived by application plug-in 325 (such as data extracted by the plug-in from fields in the document or actual multimedia data fetched by the plug-in). It will be understood that the functionality of plug-in 325 could also be implemented as part of application software 324, instead of as a plug-in.

The communication of data to the printer in a way that does not affect the appearance of the printed document above can be done by including the data as a non-printing comment field in the PDL file. This type of non-printing comment is currently allowed in Adobe Postscript or Hewlett-Packard's PCL. Often a long sequence of unlikely characters signals the presence of such data (see "Postscript Language Document Structuring Conventions Specification, Version 3.0," Sep. 25, 1992, http://partners.adobe.com/asn/developer/pdfs/tn/5001.DSC_Spec.pdf). Using Postscript as an example, in which comments are indicated by two percent signs at the beginning of a line, data fields for a URL could be indicated as:

%% RICOH-NEPV1.0-URLITEM
page=1field="Pointer" type="string" value=-
"http://www.cnn.com.1234"

Performing this processing in an application plug-in means that processing can be specialized for an application. For example, a PowerPoint plug-in can include commands that trigger the printer to search in online databases of previously recorded presentations.

FIG. 3(a) further shows a printer 304 having document processing software 326 and storage 329. In this example, document processing software 326:

a. determines whether the document contains application-derived data, and whether any further processing should be applied to the document (see 508). For example, the printer searches the received PDL file for commands and data in the comments. If the commands indicate that the document should be searched for links or data, the PDL file is searched for those elements. The printer can receive query commands to retrieve image data, audio clips, URLs, or video clips. Functional descriptions of such commands include but are not limited to:

Search this document for any URLs;
Search this document for specific URLs;
Search this document for audio clips;
Search this document for video clips;
Retrieve and analyze any URL found (or a particular URL). The analysis preferably includes one or more of: extracting a host name, or directory information, or inferring a file type from a file name extension, or extract query data from a URL based form submission. For example: Extract all references to the New York Times web site, or all references to ".jpg" files, or all requests to the local workflow server for specific documents.
Extract key video frames from any URL (or particular URL);
Add bar codes to printed output;
Save data on printer's local storage
Publish content of any URL (or content of a particular URL) to the web;
Ask user for confirmation before taking action;
Never ask for user confirmation b. The printer 304 optionally processes the document to produce printer-derived data, e.g., a filter might be applied to postscript data that detects web URL's. In this document, processing by the printer is classified as simple or complex. In general, simple processing involves the printer executing a well-defined external command or recognizing regular expressions (such as URLs). Complex processing by the printer involves performing a content-based operation on the PDL.

In a preferred embodiment, the printer software 326 executes simple processing. It inspects the comments in the PDL file and when it finds:

%% RICOH-NEPV1.0-CONTENT-FILTER NO
it determines that a content-based analysis of the PDL is not needed. Instead, printer 204 executes a command from data processing system 302.

c. The printer decides and performs an action in accordance with the content of the received document, e.g., the commands in the document might indicate that the document should be searched for links to video files and if such links are found, the video should be retrieved, key frames extracted from it, and a video paper representation constructed. A video paper layout may, for example, disrupt the original layout of the document. Alternately, it may be constructed in a layout that minimizes this disruption. For example, many URLs can be rewritten as bar codes, using at most space occupied by the textual form of a URL in the original document. As another alternative, the video paper including information not in the original document (such as bar codes, links, etc) can be printed as a separate document or as a cover sheet to the original document.

In general, if a retrieval command is embedded in the comments and the appropriate data is located in the PDL, then the retrieval command is executed by the printer, the retrieved data modified as specified (for example, key frames extracted from the video), and the printed document is modified appropriately. If a retrieval command is not embedded in the comments, but URLs pointing to multimedia are present (or if the multimedia content itself is present in the PDL), the user is prompted for whether he would like the printer to execute the retrieval of multimedia data. As described above, the multimedia content is then retrieved and stored on the printer or on an associated storage device (either a default or as indicated in a command). Then the paper document is printed and optional additional actions are performed as described below.

In still other embodiments, the printer can perform various summation functions such as speech recognition for audio files, key frame extraction for video files, and so on.

Key frame extraction is described, for example, in the following documents, which are incorporated by reference in their entirety:

Hull, Erol, Graham, and Lee, "Visualizing Multimedia Content on Paper Documents: Components of Key Frame Selection for Video Paper," Proceedings of the Seventh International Conf. On Document Anlaysis and Recognition, ICDAR 2003.

A. Girgensohn and J. Boreczky, "Time-Constrained Keyframe Selection Technique," IEEE Multimedia Systems 99, IEEE Computer Society, V. 1, 756-761, 1999.

In summary, in the system shown in FIG. 3(a), when the user executes a print command, the application processes the source document and creates a page description language (PDL) version of the document that includes application-derived data computed by an application plug-in. Document processing software on the printer detects the presence of that information and prints the original document, along with additional information in accordance with the original document. The printer also decides what additional actions should be executed, as a function of the application-derived, and printer-derived characteristics of the document.

The following paragraphs discuss other implementations of the present invention.

Driver Data, Simple Document Processing by Printer

Figure 3B:
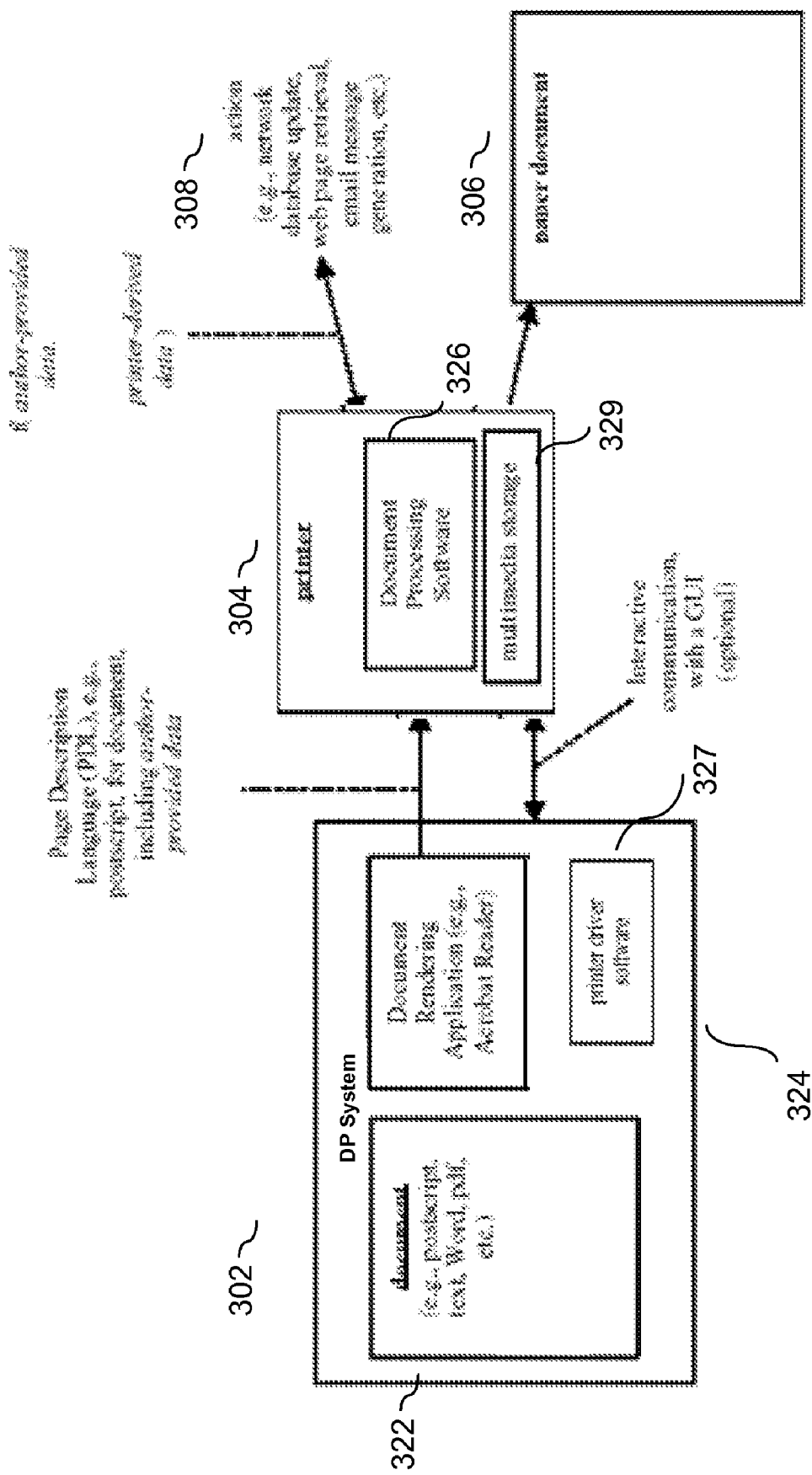
FIG. 3(b) shows a second embodiment of the present invention for printing a paper document.

FIG. 3(b) shows a second embodiment of the present invention for printing a paper document and optionally performing other actions. FIG. 5(b) shows a flow chart of a method used by this system. In this example, a print driver 327 provides data (such as the name of a database to be updated or providing a URL of multimedia data to augment the original document). In one embodiment, print driver 327 creates PDL files with commands embedded in comments that indicate whether a document should be searched by the printer for multimedia links or multimedia data and the action (s) that should be performed on those links or data. The print driver then creates a PDL file with multimedia links or data in the comments so that no searching of the document need be performed by the printer.

Performing this processing in a print driver means that the functionality can be delivered in a generic way, perhaps across all applications. For example, an instruction could be added to every document sent to the printer that tells it to search the document for URLs that point to video clips and to create a paper-like summary for each clip. In one implementation, at installation, the print driver is configured to indicate its multimedia handling capabilities. For example, whether it should always look for URLs, always retrieve video clips before sending a document, always extract key frames before sending a document, and so on.

Figure 3C:
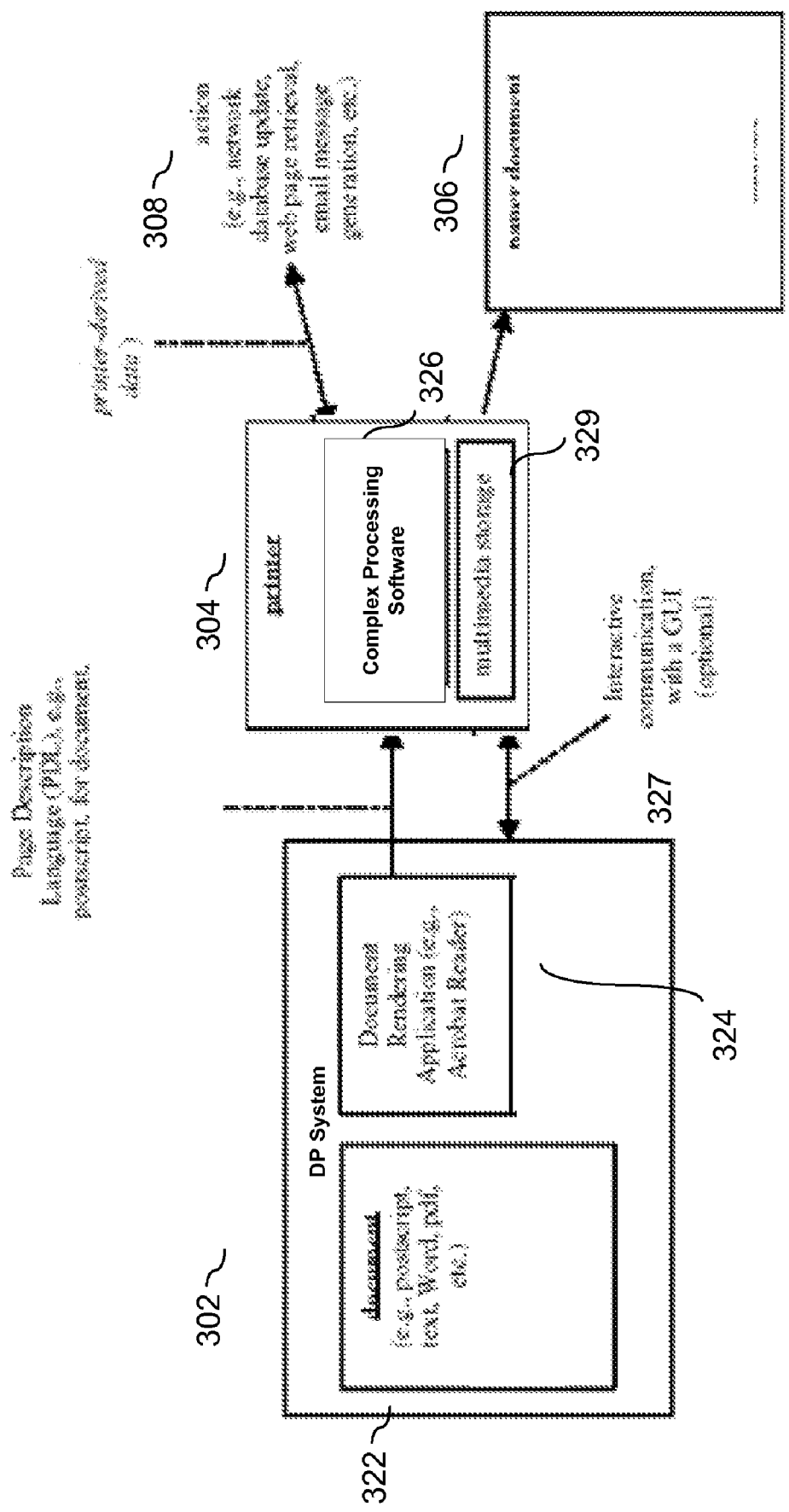
FIG. 3(c) shows a third embodiment of the present invention for printing a paper document.
Figure 3D:
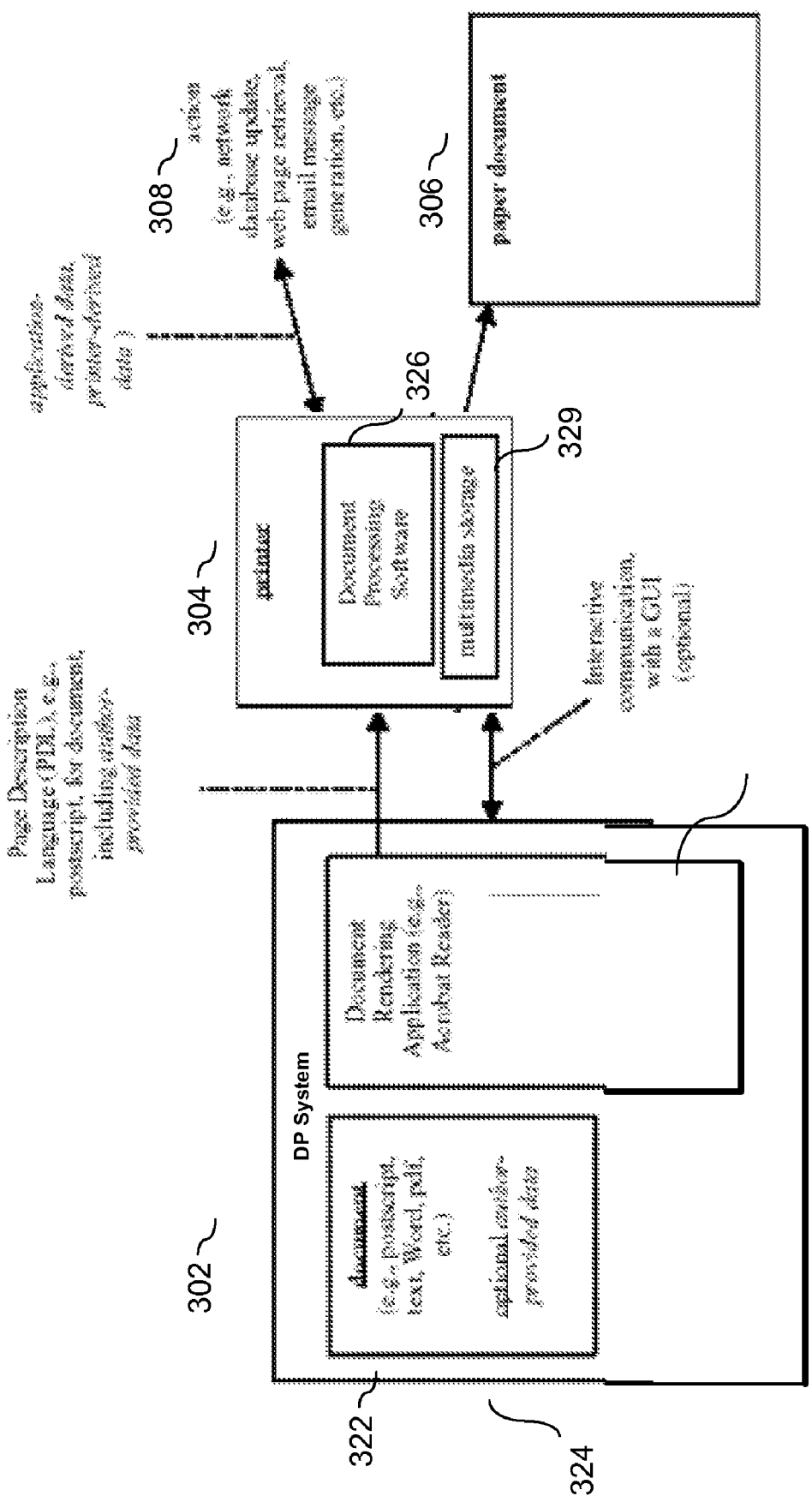
FIG. 3(d) shows a fourth embodiment of the present invention for printing a paper document.

This implementation (and that of FIGS. 3(a) and 3(d)) is useful in systems where data sent to the printer is commonly stored in a print queue. In such systems, the protocol does not allow for user interaction with the printer. Thus, any special communication must be embedded within the data initially sent to the printer. Ideally, the embedded data does not affect the print spooler or other forwarding device, while remaining easy for the printer to detect and parse. As an example, the user inserts the following PostScript metadata into the print stream. Note that this metadata has the format of a non-printing comment.

```
%% RICOH-NEPV1.0-URL-ACTION page=1,
   x=1234y=1856url=http://www.cnn.com/1234
   action=Retrieve_and_summarize
   multimedia_storage=on_printer
```

The above example indicates a URL where multimedia data is located. Document processing software 326 of printer 304 looks for commands within the print stream and processes them. Thus, in the above example, software 326 would retrieve the multimedia content at www.cnn.com/1234 and print a barcode on the printed document at location x=1234; y=1856, where the bar code indicates a storage location of the retrieved multimedia data. Other examples of actions taken by printer 304 in various embodiments include one or more of the following:

Collect all form data from the print stream and insert it into a database;

Perform arbitrary calculations and sending mail messages to a known address

Detect web URLs in the document and instruct a company's web proxy server to pre-cache those pages or store an archival copy Download web URLs and print those web pages as an attachment to the document being printed.

No Author-Provided Data, No Application Plug-In, Complex Document Processing by Printer FIG. 3(c) shows a third embodiment of the present invention for printing a paper document and additionally performing an action. FIG. 5(c) shows a flow chart of a method used by this system. In such an implementation, analysis of the document is performed on the printer 304, eliminating the need for modifications, special print drivers, or plug-ins on the data processing system 302.

In one embodiment, printer 304 detects web URLs in the PDL, retrieves those pages, and prints them as an attachment to the original document.

In another embodiment, the printer pre-caches web pages corresponding to URLs in the document under the assumption that those web pages will soon be accessed by the user printing the document with their URLs. Alternatively, the printer 304 retrieves the web pages and stores them in a database.

In another embodiment, the printer retrieves the multimedia content for some or all URLs in a document, creates a summary of their contents (URL, title, author, date printed, number of pages, thumbnail for a web page, short web page text summary, key frames from a video clip, etc) and prints that summary, either embedded in the original document or as an addendum.

The above embodiments provide examples of applying a calculation or analysis to the document received by the printer 304 and performing an action (besides printing) based on the calculation or analysis.

Author-Provided Data, No Application Plug-In, Simple Document Processing by Printer FIG. 3(d) shows a fourth embodiment of the present invention for printing a paper document and optionally performing other actions. FIG. 5(d) shows a flow chart of a method used by this system. In this example, the user provides data (such as the name of a database to be updated or providing a URL of multimedia data to augment the original document). This user-provided data can be provided with or without interaction by the user with the printer. In this example, the author includes a command in a document to be printed by adding the command as a non-printing comment field in the document. This type of non-printing comment is currently allowed in, for example, Adobe Postscript and Hewlett-Packard's PCL printer language.

Additional Embodiments

It will be understood by persons of ordinary skill in the art that the processing described above can be performed at various locations within the system. For example, the processing described above in connection with "complex document processing" performed by the printer 304 could also be performed, either totally or partially by data processing system 302. Similarly, processing described as being performed by software on data processing system 302 could be performed by document processing software in printer 304. Similarly, processing could be performed both by the data processing system/document source and by the printer.

One advantage of using plug-ins in data processing system 302 is that they are easy to add to existing software. In contrast, one advantage of performing most or all processing on the printer side is that printers are easier to maintain and service than user computers. In addition, if a large enterprise is going to purchase special processing software, it is less expensive to purchase software that runs on a small number of printers as opposed to software that runs on each user machine. This is even more important if special purpose hardware (such as a powerful signal processor) is needed to perform the function, because of the expense and difficulty of such installations. Moreover, the work environment of printers is usually better monitored and it is physically easier to maintain security over printers that contain sensitive analysis programs (such as programs that monitor compliance with licensing or seat requirements or with security requirements) than if this analysis software was located in users' computers.

The following paragraphs contain additional examples of "complex processing" by a printer. The printer recognizes a PDL file directly and analyzes the file to detect certain known fields. As stated above, these embodiments could also be implemented on data processor 302.

Printer with Embedded Multimedia Retrieval: When a user prints, for example, PowerPoint slides, the printer searches a database of previously recorded audio/video presentations including slides. The printer matches images extracted from the PowerPoint slides with images saved by the presentation recorder. A video paper printout is created and printed that includes bar codes providing access to the previously saved multimedia presentations, along with the slides that were originally sent to be printed.

Printer With Embedded Video Clip Segmentation and Web Publishing: A user "prints" a video recording that is segmented into clips by the printer. The printer displays the results to the user in a print dialog box. The user can then choose to publish clips on the web. The clips are either made available on a web server resident in the printer or copied to another web repository (for example, www.documentmall.com). The printer also produces a paper record of this transaction that includes the web address where the clips can be found. Other embodiments choose clips interactively, via a print driver or plug-in, or by using a default defined within the printer.

Printer with Embedded Audio Clip Segmentation and Web Publishing: A user "prints" an audio recording that is segmented into clips by the printer. The printer displays the results to the user in a print dialog box. The user can then choose to publish clips on the web. The clips are either made available on a web server resident in the printer or copied to another web repository (for example, www.documentmall.com). The printer also produces a paper record of this transaction that includes the web address where the clips can be found. Other embodiments can choose clips interactively, via a print driver or plug-in, or by using a default defined within the printer.

Other embodiments may automatically choose clips or samples based on identifying a face in the document and finding audio clips of that person speaking. Other embodiments may print an automatic transcript of the audio clips.

Printer with Embedded WWW search engine: The user enters a World Wide Web search query on a print dialog box. The printer does the search and displays the results. The results are formatted to take advantage of the printer's special capabilities (e.g., its ability to print in color and on legal size paper). In this embodiment, the printer includes a network interface and its own web crawler, which yield a very fast search. In a related embodiment, the printer receives a file of URLs, such as a printout of a favorites file from a browser and prints a summary of the contents, where the summary includes retrieved multimedia data.

Printer with Embedded Video Clip Retrieval and Key frame Selection: The user "prints" a web document that contains references to video clips. The video clips are automatically downloaded and key frames are chosen from each one. A set of key frames from each clip (e.g., 5 key frames per clip) are printed near each link in the document. This embodiment gives the user an idea about the content of each clip before deciding whether it should be retrieved and played.

Printer with Embedded Image Search Engine: The user "prints" a document containing an image such as a logo and the printer executes a Web search for similar images of different qualities. Those images are displayed to the user in a print dialog box. An example usage would be someone printing a letter with a poor quality company logo on it. The printer would automatically find a better logo, thus improving the overall appearance of the document and the user's satisfaction with the printer. In certain embodiments, the printer would get the user's approval before making the substitution.

Printer with Embedded Weather Map Retrieval: A user issues a "print weather" command to the printer (see, for example, FIG. 3(d)). The printer would automatically contact the National Weather Service (NWS) and download a weather map as well as a text summary for current and forecast conditions. The characteristics of the data are determined from a print dialog interface. The printer could periodically query a web site such as http://www-.wrh.noaa.gov/Monterey/ and download the latest weather maps and textual forecasts such as http://www-.wrh.noaa.gov/cgi-bin/wrhq/TotalForecast.csh?Total-Forecast+Monterey+CA+096+043+MAPCO-ORDS^197^89. When a user prints some other document to this printer, this previously downloaded weather data could be displayed in the print dialog box and the user could either just view it right there or print some selection from it as an addendum to the current document or as a separate document (i.e., printing the current document is not required). Alternatively, instead of using the print dialog box, similar functionality could be provided with a web browser interface. Another alternative system configuration would contact the NWS web site when the user issues the print command. The advantage is that the latest information would be obtained. A disadvantage might be the time required to wait for the retrieval to be performed. Also, the web site might be down at the particular moment when the query is issued.

Printer with Embedded Aerial Image Retrieval: A user enters a street address in a print dialog box and the printer retrieves an aerial image from an external server (for example, Mapquest.com) and prints the image at a user-prescribed resolution with a user-specified color scheme. Alternatively, the printer maintains or has access to a local database of aerial images. Use of a local database reduces access times and maintains privacy of the user. Use of a local database keeps outside persons from knowing what has been searched for or printed.

Printer with Embedded Aerial Image Recognition and Highlighting: A user "prints" an aerial image and the printer recognizes specified features in those images, such as automobiles or houses. Those features are highlighted in the output image. An alternative configuration contains a method for periodically downloading aerial images for a specified set of locations and applying the aerial images recognition techniques repeatedly. This provides a way for the printer to notice differences over a period of time. Note that placing the recognition software in the printer increases the security of the software. This is important is the recognition software is secret or maintained with high security. It also makes it easier to execute the recognition software on a high-performance processor since there are usually fewer printers than user machines.

Interactive Communication with a Printer

Figure 4:
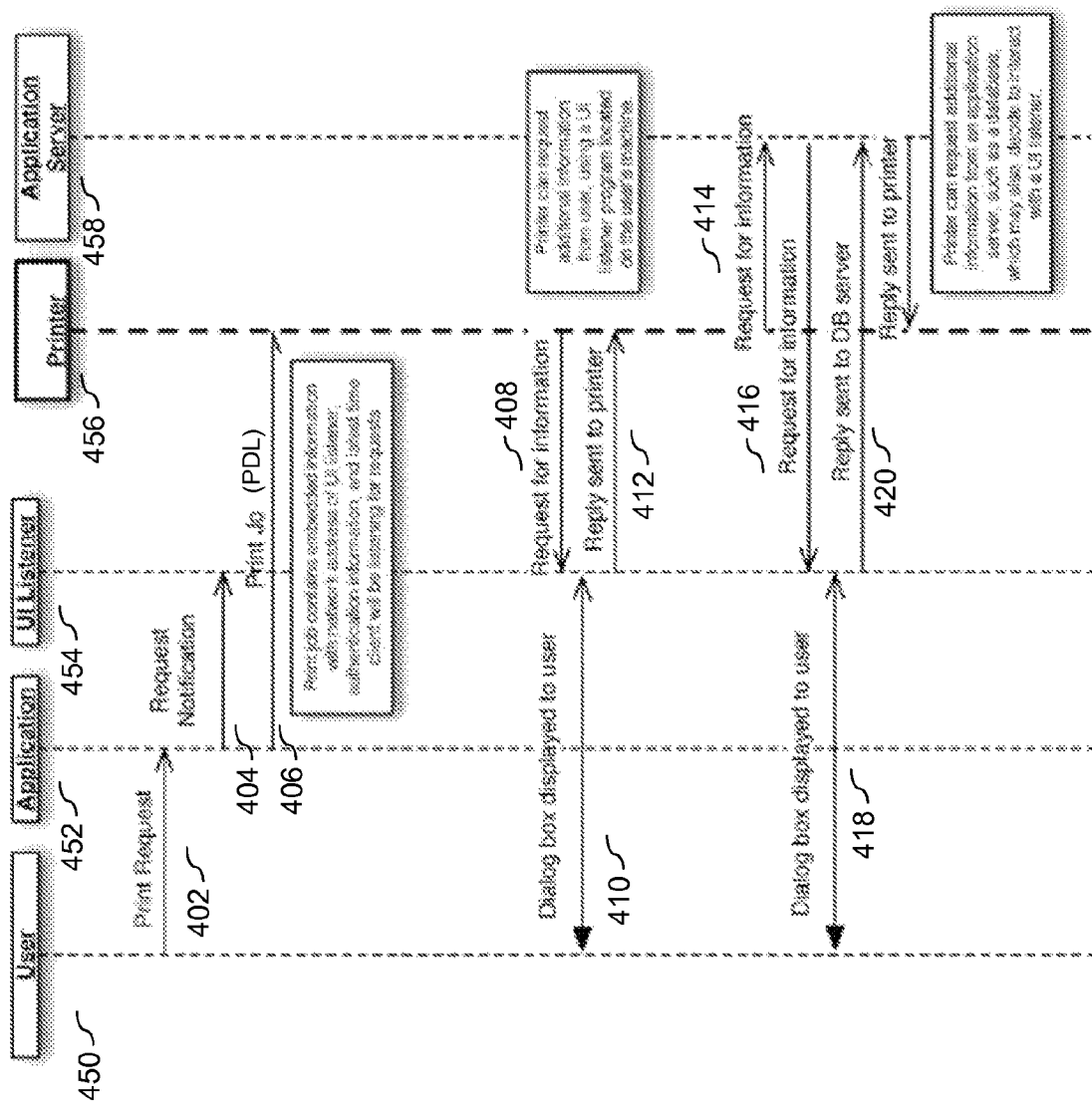
FIG. 4 shows an example of interactive communication with a printer in accordance with the present invention.

FIG. 4 shows an example of interactive communication with a printer in accordance with the present invention.

In general, conventional printer drivers in modern operating systems are not designed to facilitate interactive information gathering. Because the print job can be redirected to another printer, or the printing protocol does not allow such interactive sessions, the operating system does not encourage interaction with the user. Once initial printer settings are captured, further interactions are generally not allowed in conventional printers. One approach to this problem is to embed metadata into the print stream itself, as noted above. However, it is possible that the printer could need to ask the user for more information, in response to computations made from the data supplied by the user. In addition, the printer itself might delegate some tasks to other application servers, which might in turn need more information from the user. So-called "Web services" or "grid computing" systems are examples of the sort of application server that the printer might trigger.

In order to allow this interaction, without modifying printer driver architecture of the underlying operating system, an extra mechanism, such as the one shown in FIG. 4, is constructed. A "UI Listener," program 454 listens to a network socket, accepts requests for information 408, interacts with a user to obtain such data, and then sends the data back to the requester.

Once a print request 402 is sent by user 450 and notification requested from the UI listener 404, the print job is sent by application 452. Here, the print job contains embedded information including the network address of the UI listener, authentication information, and the latest time that the client will be listening for requests.

If the printer requires additional information of confirmation, it sends a request 408, which is detected by the UI listener, which displays a dialog box to obtain input from the user 410. An example of such as request might be a request for a password or user confirmation code that the user must enter to access a database 458. Alternatively, the printer asks for additional information based on computation, such as noting the absence of a required field and asking for a value to be entered before printing. The user's input is included in a reply 412 sent to the printer. If the reply does not satisfy the printer it may ask for additional information (not shown). If the reply does satisfy the printer, it takes a next step. This step might be to perform an action such as sending an email (not shown). The next step might also be sending a request for information 414 to an application server (such as a database) 458. In this example, application server 458 also sends a request for information 416, which is detected by the UI listener. The user is prompted 418 and his response forwarded to the application server 420. In this example, a reply is then sent from the application server 458 to the printer 456. It will be understood that a particular embodiment may include either or none or requests 408 and 416 without departing from the spirit of the present invention.

A program such as that shown in FIG. 4 may have a fixed set of possible interactions, or may accept a flexible command syntax that allows the requester to display many different requests. An example of such a command syntax would be the standard web browser's ability to display HTML forms. These forms are generated by a remote server, and displayed by the browser, which then returns results to the server. In this embodiment, however, the UI listener is different from a browser in that a user does not generate the initial request to see a form. Instead, the remote machine generates this request. In the described embodiment, the UI listener is a server, not a client.

Because network transactions of this type are prone to many complex error conditions, a system of timeouts would be necessary to assure robust operation. Normally, each message sent across a network either expects a reply or is a one-way message. Messages which expect replies generally have a timeout, a limited period of time during which it is acceptable for the reply to arrive. In this embodiment, embedded metadata would include metadata about a UI listener that will accept requests for further information. Such metadata preferably includes at least a network address, port number, and a timeout period. It might also include authentication information, designed to prevent malicious attempts to elicit information from the user. Because the user cannot tell whether the request is coming from a printer, a delegated server, or a malicious agent, prudence suggests strong authentication by the UI listener. If the printer or a delegated application server wishes more information, it can use the above noted information to request that the UI listener ask a user for the needed information.

While the present invention has been described with reference to certain preferred embodiments, those skilled in the art will recognize that various modifications may be provided. For example, certain embodiments employ multiple application servers, acting in cooperation to perform a function or request. Any of the above functions or requests can be sent across a network, or using local cables such as IEEE1394, Universal Serial Bus, or wireless networks such as IEEE 802.11 or IEEE 802.15 networks, in any combination. Variations upon and modifications to the preferred embodiments are provided for by the present invention, which is limited only by the following claims.

What is claimed is:

1. A method performed by a printer, comprising:
  gathering, by the printer, information about multimedia data that is accessible to the printer; and
  creating, by the printer, a summary of the accessible multimedia data.

2. The method of claim 1, further comprising printing the created summary.

3. The method of claim 1, where the printer is connected to a network and can access multimedia data via the network.

4. The method of claim 1, where the printer stores multimedia data and the stored data is the data accessible by the printer.

5. The method of claim 1, where the printer has access to a database containing multimedia data.

6. The method of claim 1, where the summary includes a representation of audio data.

7. The method of claim 1, where the summary includes a representation of video data.

8. The method of claim 1, where the summary includes a representation of graphical data.

9. A method of improving print quality of a printer, comprising:
  receiving, by the printer, a first document containing a first image;
  searching, by the printer, a network in order to locate a similar image;
  determining, by the printer, which of the first image and similar image has better print quality;
  responsive to the similar image having better print quality, creating, by the printer, a printable document equivalent to the first document, except that the similar image replaces the first image.

10. A method, comprising:
  receiving, by a printer, a file comprising URLs;
  retrieving, by the printer, content for at least one URL in the file; and
  creating, by the printer, a printable document comprising a summary of the retrieved content.

* * * * *